Aug. 5, 1958   F. H. PARKER   2,845,948
MIXING VALVE
Filed Dec. 1, 1953   3 Sheets-Sheet 1

INVENTOR.
FRANK H. PARKER
BY
Frank H. Harmon
ATTORNEY

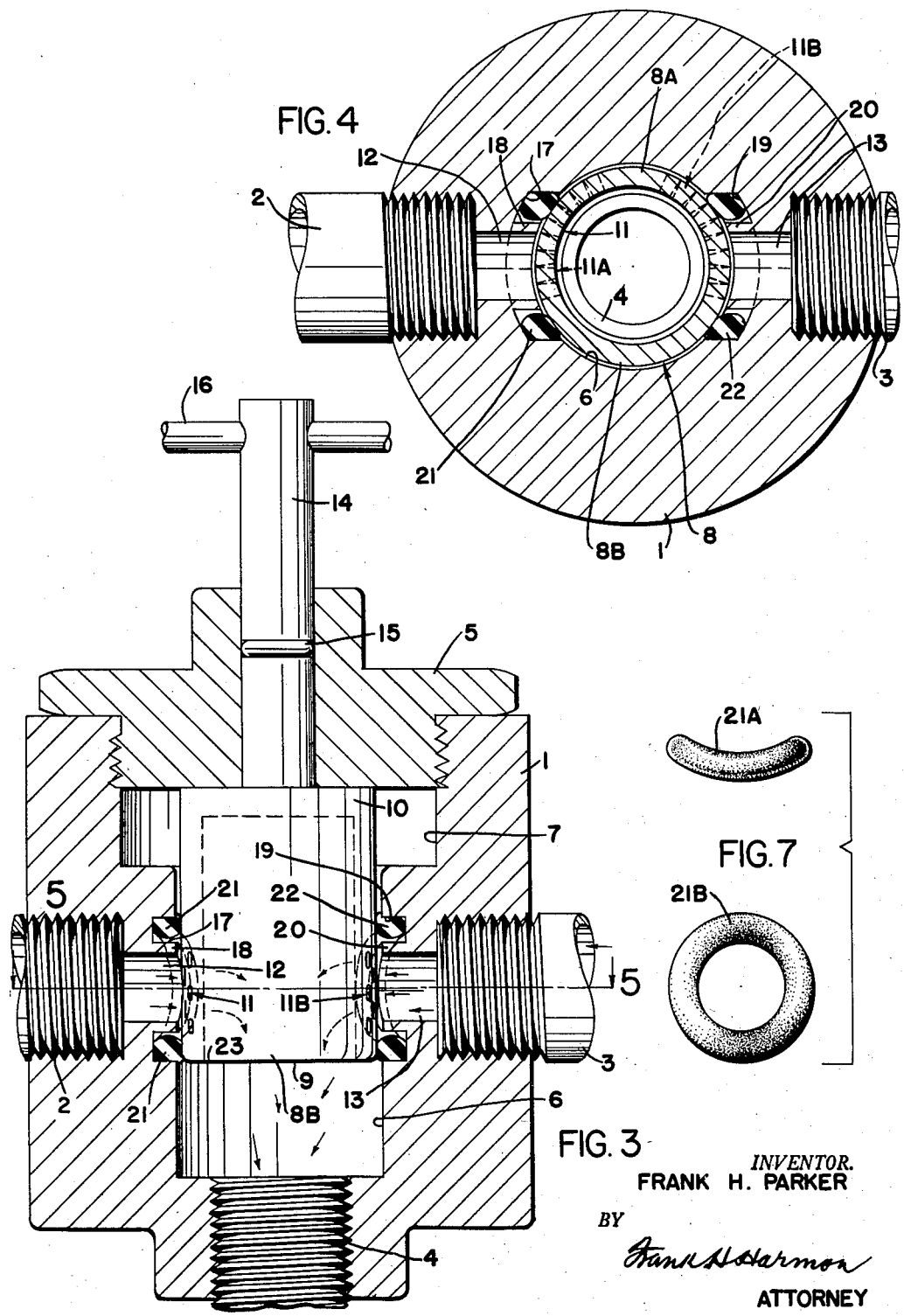

Aug. 5, 1958  F. H. PARKER  2,845,948
MIXING VALVE
Filed Dec. 1, 1953  3 Sheets—Sheet 3

INVENTOR.
FRANK H. PARKER
BY
*Frank H. Harmon*
ATTORNEY

United States Patent Office 2,845,948
Patented Aug. 5, 1958

2,845,948
MIXING VALVE

Frank H. Parker, Cleveland Heights, Ohio, assignor, by direct and mesne assignments, to Stephen C. Peplin, Westlake, Ohio, trustee Application December 1, 1953, Serial No. 395,403

6 Claims. (Cl. 137—625.17)

This invention relates in general to valves and has for its general object to provide an improved mixing valve that is adapted to mix two separate streams of fluid into a blended discharge, and to control the flow of one stream to the exclusion of the other and to control the volume of discharge in such an environment, for instance, as a hot and cold water faucet, or the like.

One of the primary objects of the invention is to provide such a mixing valve that comprises a single moving part, which may take the form of a hollow cylindrical ported shell, whereby rotation of the valve provides for mixture control and axial adjustment provides for volume discharge control.

Another important object is to provide an improved sealing means for sealing against leakage from either fluid inlet into the valve housing, regardless of the fluid pressures in the fluid inlet supply lines.

A further important object is to provide such an improved sealing means that not only does not oppose fluid pressure in the supply lines to become loosened in the event of increasing pressure, but utilizes the increasing fluid pressure to become increasingly tightened in accordance with the sealing requirements imposed by increased fluid pressure in the supply lines so as to safeguard against leakage.

Another important object is to provide such a sealing means comprising a separate seal for each inlet in the form of an O ring so designed and arranged in an internal recess in the valve housing separately surrounding each inlet itself so as to be slightly compressed therein by engagement with the smooth external surface of the valve and yet adapted to receive fluid pressure flow from the supply lines through the inlets to a point back of the O rings so as to effect increasingly greater sealing engagement of the sealing rings in accordance with the demands of increasing supply line fluid pressures.

Another object is to provide such a hollow cylindrical valve that has a smooth external surface to avoid wear on the sealing rings which it contacts and a novel porting arrangement for fine fluid mixture control.

Another object of the invention, in the interests of providing the hollow valve shell with a smooth external surface in order to avoid wear on the fluid sealing rings which it contacts, is to so proportion the cross-sectional dimension of the rim of each fluid inlet sealing ring with respect to the ports of the two ported areas that the width of each port with respect to the plane of surface engagement of the hollow shell valve with the sealing rings in the plurality of possible planes of movement of the valve is such as to be smaller than the cross-sectional dimension of the rim of each sealing ring in order to avoid wear, abrasion or cutting of the sealing rings or radial expansion of the sealing rings into the valve ports, which would interfere with the proper operation of the valve and the sealing effect of the sealing rings.

Another object is to provide such a mixing valve that makes for the maximum ease of assembly and disassembly, the minimum number of stationary and moving parts, the minimum of wear of parts and the maximum ease of replacement and economy thereof in construction and use.

With the foregoing and other objects in view, the invention resides in the combination of parts and in the details of construction hereinafter set forth in the following specification and appended claims, certain embodiments thereof being illustrated in the accompanying drawings, in which:

Figure 3 is a view similar to Figure 2, showing the valve elevated, for volume discharge, and rotated to open both inlets by registering valve ports therewith in equal amounts, and showing the top of the shell to be solid with no openings therein;

Figure 4 is a view in section taken along line 4—4 of Figure 2;

Figure 5:
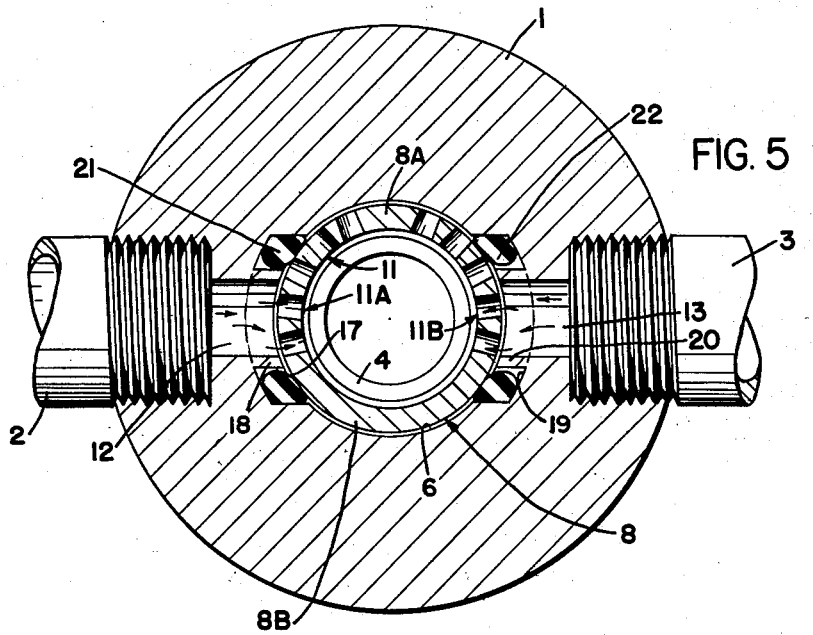
Figure 5 is a view in section taken along line 5—5 of Figure 3.
Figure 6:
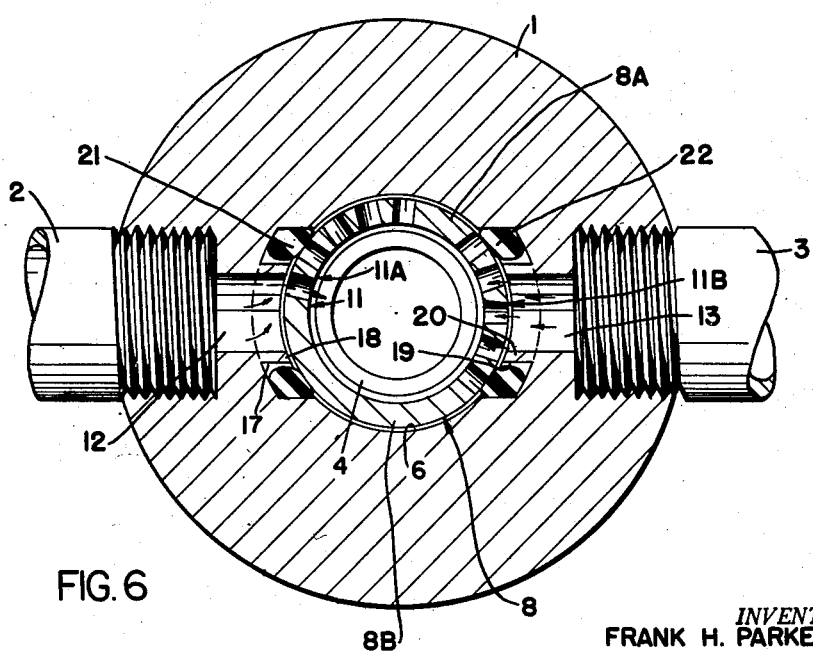

Figure 6 is a view similar to Figure 5, showing the valve rotatively adjusted to open the two inlets in different amounts, and Figure 7 is a composite enlarged detail view showing the O ring in side elevation, assuming the O ring to be preformed to be warped to accommodate the radius of curvature of the internal housing groove surrounding each individual inlet, and in top plan, assuming the ring to be circular and symmetrical.

Figure 1:
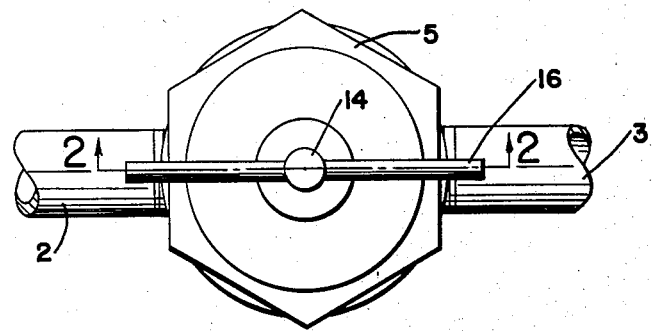
Figure 1 is a top plan view of the valve housing and two fragmentary portions of fluid supply lines.
Figure 2:
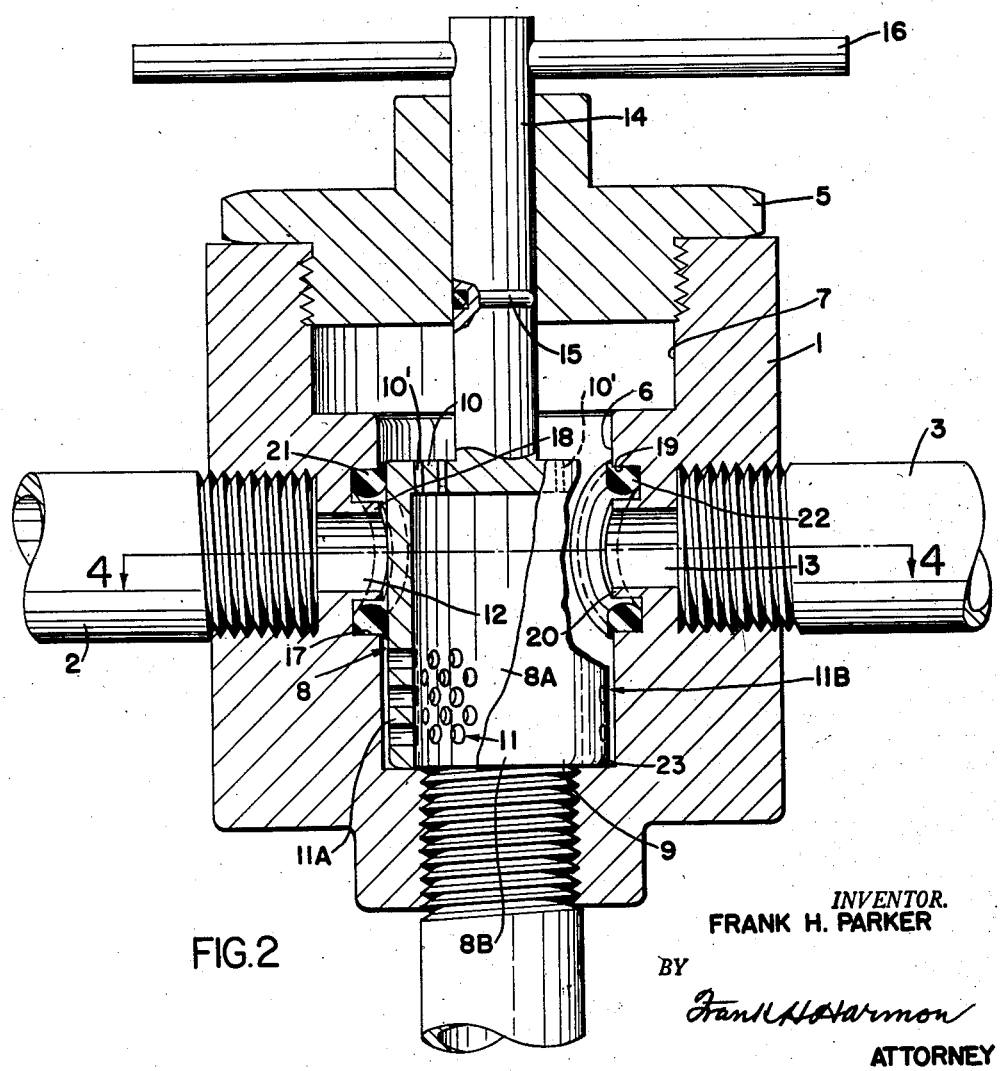
Figure 2 is a view in section taken along line 2—2 of Figure 1, showing the hollow valve shell manually depressed in the valve housing to a point where the porting area is below the inlets so as to close both inlets to the interior of the valve and to the discharge conduit, and also showing the top of the shell to have openings therein.

Referring more particularly to the drawings, Figures 2 and 3 show a valve housing 1 that is internally screw threaded to receive two fluid supply pipes 2 and 3 and a discharge pipe 4. The housing is also screw threaded to receive a closure cap 5. The housing is provided with a main cylindrical bore 6 and a larger diameter bore 7 thereabove and below the closure cap 5.

The valve is generally indicated at 8 and is preferably in the form of a hollow cylindrical shell with an open bottom 9, a closed top wall 10 and a novel system of ports, generally indicated at 11, in its side walls intermediate its upper and lower ends for registering with inlets 12 and 13 from the two supply lines 2 and 3 for fluid flow therefrom into the interior of the valve and out through the discharge pipe 4. Rigid with the valve is a stem 14 that is rotatively and axially slidably mounted in cap 5 and provided with a sealing ring 15. The stem is shown with a conventional manual operating handle 16 for rotating the valve about its axis and for slidably moving the same axially in the housing from the bottom of the cap 5 as its upper limit and the bottom of housing bore 6 as its lower limit of axial movement.

As the result of extensive research development and practical experience in the art, I have found that the principal underlying reason that the conventional sealing expedients employed in structures of this nature is, that in employing sealing rings that are circumferentially disposed to the valve or its operating bore in the valve housing, the sealing rings are necessarily subjected to the fluid pressure flow in such a manner as to oppose the latter. Thus, due to this fact, these are subject to displacement and undue wear so as to become immediately ineffective as such, especially in the face of high fluid pressures and variances of fluid pressures.

In order to overcome these disadvantages, and with reference to Figures 3, 4 and 7, I propose to form in the housing an internal groove 17 that follows the radius of curvature of the bore 6 and that surrounds the inlet bore 12 and which is spaced therefrom circumferentially by the flange 18 formed by the groove and whose inner diameter is coextensive with the inlet. Surrounding inlet 13 is an identical groove 19 and flange 20.

These grooves 17 and 19 are each designed to receive an O ring 21 and 22, respectively, of identical size and design. In assembling, and with the valve, cap and stem removed, the two O rings are first placed in their respective grooves. The outside diameter of each flange 18 and 20 with respect to the inside diameters of the O rings is such that the O rings are preferably slightly stretched in placing them over the flanges and into the grooves. This assists in avoiding their inadvertent displacement. The depth of each groove is preferably such that when the O rings are inserted, the O rings very slightly extend inwardly into the main bore 6. Hence, when the valve is inserted into the bore 6, it places the O rings slightly under compression in a plane parallel to the bore 12, or 13, of the inlets. If difficulty is encountered in inserting the rings in the grooves or maintaining them there, especially during assembly of the valve, they may be preformed to be warped, as shown at 21A, as shown in Figure 7, instead of circular and symmetrical, as shown at 21B.

As previously stated, the outer surface of the valve is smooth and care is taken to so form the parts 11 so that they are countersunk to avoid any sharp edges engaging the two O rings. Likewise, I prefer to provide the lower edge of the valve with a chamfer 23.

The porting system of the valve has been generally indicated at 11. The details of this system will be later described in detail, but suffice it to say at this time, that the uppermost of the ports is at a level below both inlets when the valve is moved down to its lower limit, as shown in Figure 2, so as to completely close all flow from either inlet into the hollow valve. Upon existence of pressure of any degree in either line through either inlet, neither O ring is in a position to oppose fluid pressure so as to cause displacement from its proper sealing position. On the contrary, the fit of the O ring within its respective groove is such as to entrain pressure fluid into the groove back of the O ring to force it forward against the valve surface in temporary slightly compressed and distorted form to effect a tighter and more effective seal in the area of juncture of the groove with the main valve housing bore 6. Rotation of the valve, when in its down position of Figure 2, effects nothing as it would remain closed.

With respect to the overall vertical length of the valve porting area, reference to Figure 2 will show it to be comparable to, or slightly in excess of, the diameter of the inlet bores 12 and 13. Circumferentially speaking, reference to Figures 4, 5 and 6 will show the porting area to be divided into two porting areas 11A and 11B separated by a relatively smaller valve arc 8A and a relatively larger valve arc 8B. Moreover, the two porting areas are each comprised of a series of axially and arcuately staggered ports.

Thus, as previously indicated, Figure 2 shows both inlets completely closed by the single valve 8 which comprises the only moving part of the assembly moved axially downward to that position by any suitable manual control. Figure 4 likewise shows the valve closed, with the two porting areas 11A and 11B in dotted lines to indicate their locations to coincide with those of Figure 2.

In Figures 3 and 5, I have shown the valve 8 elevated to its upper limit for full fluid volume intake and discharge. Also with respect to mixture control, I have shown the valve manually rotated to such a position as to bring the same number of ports in registry with each inlet. In Figure 6, I have merely rotated the valve in a clockwise direction from its position of Figure 5 to bring a relatively lesser number of ports 11A into registry with inlet 12 and a relatively greater number of ports 11B into registry with inlet 13. It may be found necessary, when using an aerator, or other devices which would restrict the flow and thus create back pressure, to have openings, as shown at 10' in Figure 2, at the top of said valve to equalize the pressure of both the top and bottom of valve shell 10.

From the foregoing, it will be seen that I have provided a simple, inexpensive and efficient mixing valve, for such uses as a hot and cold faucet, which involves only one moving part, namely, a single hollow cylindrical shell, provided with such a new and novel porting structure that rotation of the shell controls mixture of hot and cold water, even to the exclusion of either, and axial movement of the shell controls volume, from full volume to complete shut-off. Moreover, I have provided a new and novel leakproof sealing means comprising individual seals about each inlet and so disposed as to not only oppose fluid pressure, but to utilize it by permitting it to apply pressure behind them to compress them into greater sealing engagement upon increasing and varying requirements imposed by such pressures.

In the interests of providing the hollow valve shell with a smooth external surface in order to avoid wear on the sealing rings which it contacts, I have clearly shown all of the ports of each ported area to be circular and appreciably less in width than the cross-sectional dimension of the rim of the two sealing rings around the two fluid inlets. The underlying purpose of this is to assist in the presentation of a smooth external hollow valve shell surface to the two fluid inlet sealing rings. Inasmuch as the cross-sectional diameter of each such sealing ring is considerably greater than the width of each of the ports in each of the two ported areas of the hollow valve shell, I avoid the possibility of the sealing rings protruding into the ports to such an extent as to be subjected to abrasion, wear or cutting or to such an extent as to bind and interfere with proper operation of the valve. I have clearly described the valve as capable of movement in a plurality of planes for fluid volume and mixture control. It is conceivable that unauthorized competitors might resort to meaningless and purposeful avoidance of my inventive concept and design the ports of the two ported areas of the hollow valve shell in configurations other than truly circular. The true significance of this phase of my inventive concept is that the width of the ports of each ported hollow valve shell with respect to the plane of engagement of the hollow valve shell with the sealing rings in the plurality of possible planes of movement of the valve is such as to be smaller than the cross-sectional dimension of the rim of each of such sealing ring for the purpose stated.

What is claimed is:

1. In a mixing valve assembly including a cylindrical valve housing with a main elongated cylindrical axial bore, a discharge outlet and a plurality of transversely diametrically opposed inlets for receiving fluid inlet lines communicating with said main axial housing bore, a single valve comprising a hollow cylindrical shell removably mounted in said main axial housing bore to be rotatably adjusted about its own axis and axially adjusted independently of rotation about its own axis, said valve having a pair of ported areas each including a plurality of ports in the side wall of said valve shell and disposed axially intermediate the upper and lower edges of said valve and spaced from each other circumferentially to be disposed transversely diametrically opposed to each other, separate sealing means for said valve consisting in an individual sealing ring for each inlet and an internal groove for each ring in said housing for receiving the ring and surrounding the bore of each separate individual inlet and conforming with the radius of curvature of said valve and having a corresponding initial fluid pressure compression against the sealing rings and in turn the outer surface of said valve to entrain fluid pressure flow in back of the sealing rings to augment its effective sealing against the surface of the hollow valve shell.

2. In a mixing valve assembly including a cylindrical valve housing with a main elongated transversely horizontal cylidnrical axial bore, a discharge outlet and a plurality of transversely diametrically opposed inlets for receiving fluid flow in balanced pressure, a single valve comprising a hollow cylindrical shell removably mounted in said main axial housing bore to be adjustable by rotation about its own axis and axially adjustable independently of rotation about its own axis, said valve having a pair of ported areas each including a plurality of ports in the side wall of said valve shell and disposed axially intermediate the upper and lower edges of said valve and spaced from each other circumferentially to be disposed transversely diametrically opposed to each other, separate sealing means for said valve consisting in an individual sealing ring for each inlet and an internal groove for each ring in said housing for receiving the ring and surrounding the bore of each separate individual inlet and conforming with the radius of curvature of the inside of the cylindrical housing and having a corresponding initial fluid pressure compression against the sealing rings and in turn the outer surface of said valve to entrain fluid pressure flow in back of the sealing rings to augment its ffective sealing against the surface of the valve body, the width of the ports of each of the valve ported areas with respect to the plane of surface engagement of the hollow shell valve with the sealing rings in the plurality of possible planes of movement of the valve is such as to be smaller than the cross-sectional dimension of each of said fluid inlet sealing rings in order to avoid protrusion of said sealing rings into any of said valve ports.

3. In a mixing valve assembly including a valve housing with a main elongated transversely horizontal cylindrical axial bore, a discharge outlet and a pair of transversely diametrically opposed fluid inlets for receiving fluid flow in balanced pressure, a single valve comprising a hollow cylindrical shell rotatably and axially slidably and removably mounted in said main axial housing bore, a pair of transversely diametrically opposed ported areas each including a series of ports in the side walls of said hollow valve shell, both ported areas being disposed axially intermediate the upper and lower edges of said valve and spaced from each other circumferentially to be diametrically opposed, sealing means for said valve consisting of an individual sealing ring for each inlet and comprising an internal groove in said housing surrounding the bore of each individual inlet and conforming with the radius of curvature of said valve, and in surface contact therewith and disposed in initial fluid pressure compression against the outer surface of said valve, said valve being rotatable about its own axis to proportionally control the fluid flow into the valve from said inlets and said valve being adjustable axially and independently of rotation about its own axis to control the volume of fluid flow into said valve from said inlets.

4. In a mixing valve assembly including a valve housing with a main elongated transversely horizontal cylindrical axial bore, a discharge outlet and a pair of transversely diametrically opposed fluid inlets for receiving fluid flow in balanced pressure, a single valve comprising a hollow cylindrical shell rotatably and axially slidably and removably mounted in said main axial housing bore, a pair of transversely diametrically opposed ported areas each including a series of ports in the side wall of said hollow valve shell, both ported areas being disposed axially intermediate the upper and lower edges of said valve and spaced from each other circumferentially to be diametrically opposed, sealing means for said valve consisting in an individual sealing ring for each inlet and comprising an internal groove in said housing surrounding the bore of each individual inlet and conforming with the radius of curvature of said valve and in surface contact therewith and disposed in initial fluid pressure compression against the outer surface of said valve, said valve being rotatable about its own axis to proportionally control the fluid flow into the valve from said inlets and said valve being adjustable axially and independently of rotation about its own axis to control the volume of fluid flow into said valve from said inlets, the width of the ports of each of the valve ported areas with respect to the plane of surface engagement of the hollow shell valve with the sealing rings in the plurality of possible planes of movement of the valve is such as to be smaller than the cross-sectional dimension of each of said fluid inlet sealing rings in order to avoid protrusion of said sealing rings into any of said valve ports.

5. In a mixing valve assembly including a valve housing with a bore that is transversely circular, a discharge outlet and a pair of inlets that are transversely diametrically opposed for receiving fluid inlet lines to communicate with said main bore, a single hollow valve body comprising a mixing chamber for the fluids from said inlet lines, said valve body being rotatably and removably mounted in said housing, a pair of transversely diametrically opposed ported areas each including a series of ports in the side wall of said hollow valve body, both ported areas being disposed axially intermediate the upper and lower portions of said valve and spaced from each other circumferentially to the diametrically opposed, sealing means for said valve consisting in an individual sealing ring for each inlet and comprising an internal groove in said housing surrounding the bore of each individual inlet and disposed so as to be in the path of fluid pressure in compression against the outer surface of said valve body, said valve body being rotatable about its own axis to proportionally control the fluid flow into the valve from said inlets.

6. In a mixing valve assembly including a valve housing with a bore that is transversely circular, a discharge outlet and a pair of inlets that are transversely diametrically opposed for receiving fluid inlet lines to communicate with said main bore, a single hollow valve body comprising a mixing chamber for the fluids from said inlet lines, said valve body being rotatably and removably mounted in said housing, a pair of transversely diametrically opposed ported areas each including a series of ports in the side wall of said hollow valve body, both ported areas being disposed axially intermediate the upper and lower portions of said valve and spaced from each other circumferentially to be diametrically opposed, sealing means for said valve consisting in an individual sealing ring for each inlet and comprising an internal groove in said housing surrounding the bore of each individual inlet and disposed in initial fluid pressure compression against the outer surface of said valve body, said valve body being rotatable about its own axis to proportionally control the fluid flow into the valve from said inlets, the cross-sectional diameter of said sealing rings being greater than the cross-sectional area of any of the ports in said two ported areas in said hollow valve shell.

References Cited in the file of this patent

UNITED STATES PATENTS

| | | |
|---|---|---|
| 208,808 | Glenn | Oct. 8, 1878 |
| 604,835 | McCarroll | May 31, 1898 |
| 1,126,478 | Joyce | Jan. 26, 1915 |
| 1,421,554 | Pohl | July 4, 1922 |
| 1,526,995 | McGinley | Feb. 17, 1925 |
| 2,132,030 | Hunt | Oct. 4, 1938 |
| 2,599,774 | Ohls | Jan. 10, 1952 |
| 2,603,449 | Overholser | July 15, 1952 |

FOREIGN PATENTS

| | | |
|---|---|---|
| 641,435 | France | of 1928 |